United States Patent
Itoo et al.

(10) Patent No.: US 9,341,255 B2
(45) Date of Patent: May 17, 2016

(54) V-BELT TYPE CONTINUOUSLY VARIABLE TRANSMISSION

(71) Applicant: KAWASAKI JUKOGYO KABUSHIKI KAISHA, Hyogo (JP)

(72) Inventors: Seiji Itoo, Akashi (JP); Ayumi Hamada, Akashi (JP); Taisuke Morita, Amagasaki (JP); Jun Takagi, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 261 days.

(21) Appl. No.: 14/260,540

(22) Filed: Apr. 24, 2014

(65) Prior Publication Data

US 2015/0308561 A1 Oct. 29, 2015

(51) Int. Cl.
*F16H 57/04* (2010.01)
*F16H 57/027* (2012.01)

(52) U.S. Cl.
CPC .......... *F16H 57/0489* (2013.01); *F16H 57/027* (2013.01); *F16H 57/0416* (2013.01)

(58) Field of Classification Search
CPC ... F16H 57/027; F16H 57/035; F16H 57/415; F16H 57/416; F16H 57/0489
USPC ............ 474/8–29, 90, 93, 144, 146; 180/246; 475/159, 210
See application file for complete search history.

(56) References Cited

U.S. PATENT DOCUMENTS

| 6,042,498 A * | 3/2000 | Kashiwase ............ F16H 37/022 474/18 |
| 8,382,620 B2 | 2/2013 | Morita |
| 2006/0270503 A1* | 11/2006 | Suzuki ............... F16H 57/0489 474/144 |
| 2008/0283326 A1* | 11/2008 | Bennett ................... B60B 3/142 180/246 |

FOREIGN PATENT DOCUMENTS

JP 2010-151237 7/2010

* cited by examiner

*Primary Examiner* — William E Dondero
*Assistant Examiner* — Robert T Reese
(74) *Attorney, Agent, or Firm* — Wenderoth, Lind & Ponack, L.L.P.

(57) ABSTRACT

Provided is a V-belt type continuously variable transmission constructed such as to accommodate in a transmission case a transmission mechanism including: a drive shaft connected to an engine flywheel and provided with a drive pulley; a driven shaft provided with a driven pulley; and a V-belt wound around between the drive pulley and the driven pulley, the V-belt type continuously variable transmission comprising: an air intake chamber for introducing cooling air to surroundings of the drive shaft; and a flywheel cover for covering at least a periphery of the flywheel located in the air intake chamber.

6 Claims, 9 Drawing Sheets

V-BELT TYPE CONTINUOUSLY VARIABLE TRANSMISSION

BACKGROUND OF THE INVENTION

1. Field of the Invention

The present invention relates to a V-belt type continuously variable transmission and, in particular, to a V-belt type continuously variable transmission attached to an engine crankshaft with a flywheel in between.

2. Description of the Related Art

A V-belt type continuously variable transmission includes: a transmission mechanism constructed from a drive shaft, a drive pulley, a driven shaft, a driven pulley, a V-belt wound around between both pulleys, and the like; and a transmission case assembly for accommodating the transmission mechanism. The drive pulley is provided with a centrifugal fan. Then, cooling air is supplied by the centrifugal fan so that the inside of the transmission case is cooled.

For example, Japanese Laid-Open Patent Publication No. 2010-151237 discloses a V-belt type continuously variable transmission attached to an engine crankshaft with a centrifugal clutch in between. The centrifugal fan is provided in the rear face of the sheave on the centrifugal clutch side of the drive pulley. Then, cooling air is introduced from an air intake chamber provided on one-end side of the centrifugal clutch side of the drive shaft and then supplied to the inside of the transmission case. The centrifugal clutch is accommodated in the clutch chamber and hence the revolving part of the centrifugal clutch does not face the air intake chamber.

SUMMARY OF THE INVENTION

Meanwhile, in a case that the V-belt type continuously variable transmission is attach to the engine crankshaft with a flywheel in between rather than with the centrifugal clutch in between and then cooling air is introduced from one-end side (the flywheel side) of the drive shaft, the flywheel faces the air intake chamber. In this case, the cooling air in the air intake chamber is easily discharged to the outer side in the radial direction of the flywheel owing to the revolution of the flywheel. Thus, supply of cooling air to the centrifugal fan is restrained.

The present invention has been made in view of the above-mentioned problem. An object thereof is to provide a V-belt type continuously variable transmission attached to an engine crankshaft with a flywheel in between in which cooling air is supplied from the vicinity of the flywheel to the inside of a transmission case so that the cooling property in the V-belt type continuously variable transmission is ensured.

In order to achieve the above-mentioned object, the present invention provides a V-belt type continuously variable transmission constructed such as to accommodate in a transmission case a transmission mechanism including: a drive shaft connected to an engine flywheel and provided with a drive pulley; a driven shaft provided with a driven pulley; and a V-belt wound around between the drive pulley and the driven pulley, the V-belt type continuously variable transmission comprising: an air intake chamber for introducing cooling air to surroundings of the drive shaft; and a flywheel cover for covering at least a periphery of the flywheel located in the air intake chamber.

According to the above-mentioned configuration, when the flywheel cover is provided, the operation of discharging the air in the air intake chamber in the circumferential direction caused by the flywheel can be restrained. Thus, even when the flywheel is located in the air intake chamber, the cooling air can be supplied from the air intake chamber to the surroundings of the drive shaft. By virtue of this, cooling air is supplied from the vicinity of the flywheel to the transmission mechanism so that the amount of cooling air supply is ensured and hence the cooling property in the V-belt type continuously variable transmission is ensured.

In the cooling device of the above-mentioned V-belt type continuously variable transmission, the following configurations may preferably be employed.

(1) Gear teeth are formed in the periphery of the flywheel.

According to the above-mentioned configuration (1), the effect of the present invention is realized suitably in a case that the gear teeth are provided in the periphery of the flywheel. That is, when the periphery of the flywheel is provided with gear teeth like a ring gear engaging with the starter and an outer periphery gear detected by a crank angle sensor, the discharging operation in the circumferential direction caused by the flywheel is further enhanced. However, the discharging operation can be restrained by the flywheel cover.

(2) A partition plate is provided for partitioning the transmission case into a transmission chamber for accommodating the transmission mechanism and into the air intake chamber, and the flywheel cover is attached to the partition plate.

According to the above-mentioned configuration (2), the flywheel cover can be arranged in an integrated manner with the partition plate. Further, when the partition plate and the flywheel cover are integrated with each other, the number of components is reduced and the assembly workability is improved. Thus, productivity is improved.

(3) In addition to the above-mentioned configuration (2), a fan is further included that is provided in the drive pulley and that supplies into the transmission chamber the cooling air in the surroundings of the drive shaft, and the partition plate is provided with a guide plate for guiding the cooling air supplied by the fan to the surroundings of the driven shaft.

According to the above-mentioned configuration (3), cooling air is guided from the drive shaft side to the driven shaft side so that the flow of the cooling air in the transmission chamber is rectified. This permits more effective cooling of the transmission chamber.

(4) In addition to the above-mentioned configuration (3), the cooling air is supplied from approximately entire circumferential directions between the flywheel cover and the partition plate to the surroundings of the drive shaft.

According to the above-mentioned configuration (4), cooling air can be supplied from approximately entire circumferential directions between the flywheel cover and the partition plate. Thus, the amount of cooling air supply is ensured so that the cooling property in the transmission chamber is ensured.

(5) In addition to the above-mentioned configuration (2), the partition plate and the flywheel cover are made from resin.

According to the above-mentioned configuration (5), heat release from the transmission chamber to the inside of the air intake chamber is restrained by the partition plate made from resin having a low thermal conductivity. Similarly, heat release from the flywheel to the air intake chamber is restrained by the flywheel cover. As such, heat release from surrounding heat sources to the cooling air in the air intake chamber is restrained and hence a temperature rise in the cooling air is restrained. Thus, the cooling property in the V-belt type continuously variable transmission is ensured.

DETAILED DESCRIPTION OF THE INVENTION

An embodiment of the present invention is described below with reference to the accompanying drawings. Here, for simplicity of the following description, the forward and the backward directions of a utility vehicle are used also for referring to the forward and the backward directions of a V-belt type continuously variable transmission and other components. Further, in the vehicle width directions, the right and the left directions viewed from the passenger of the utility vehicle (that is, the right and the left in a situation that the forward is viewed from the utility vehicle) are used also for referring to the right and the left directions of the V-belt type continuously variable transmission and other components.

Figure 1:
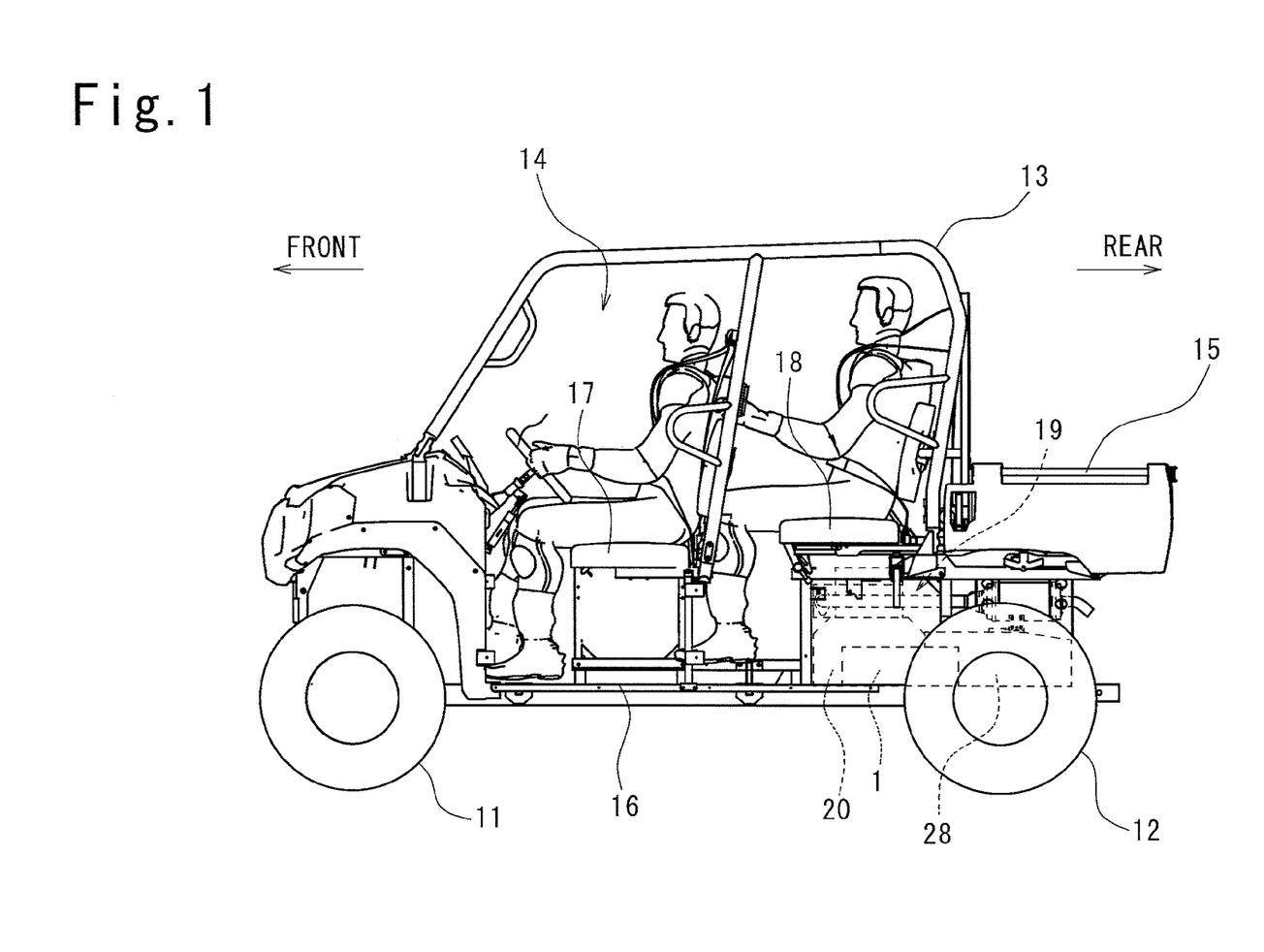
FIG. 1 is a left side view of a utility vehicle including a V-belt type continuously variable transmission according to an embodiment.

FIG. 1 is a left side view of a utility vehicle including a V-belt type continuously variable transmission according to the present embodiment, in a situation that outer-shape forming members such as doors are removed. As shown in FIG. 1, the utility vehicle includes: a pair of right and left front wheels 11 located in a front part; and a pair of right and left rear wheels 12 located in a rear part. Then, a cabin space 14 surrounded by a ROPS 13 is provided between the front wheels 11 and the rear wheels 12, and a rear deck 15 is provided behind the cabin space 14. The ROPS 13 is an abbreviation of a rollover protective structure.

The inside of the cabin space 14 is provided with: a floor panel 16 that forms a floor; a front seat 17; and a rear seat 18. An engine room 19 is formed and extends from a part under the rear seat 18 to a part under the rear deck 15. An engine 20, a transmission device 28, and a V-belt type continuously variable transmission 1 are arranged in the engine room 19.

Figure 2:
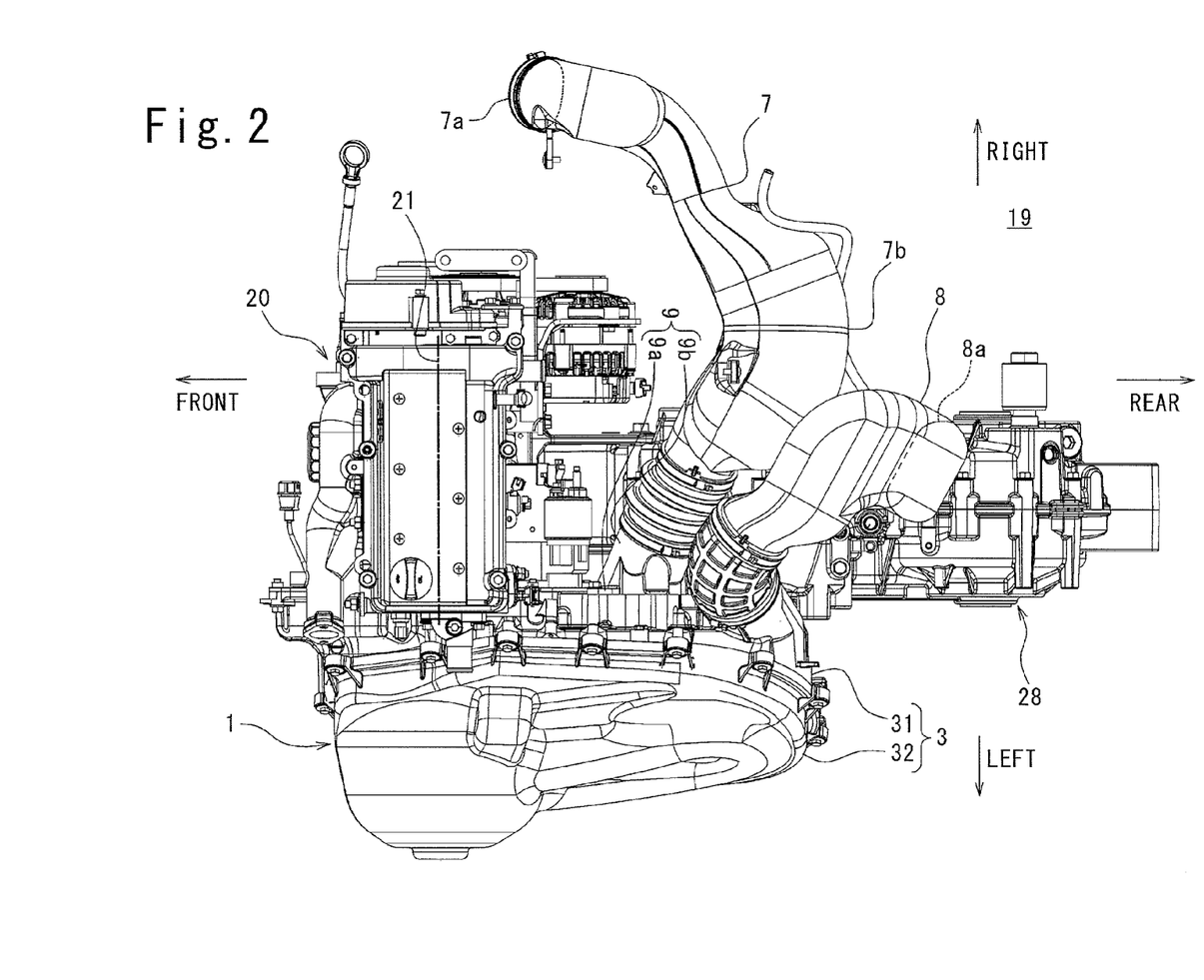
FIG. 2 is a top view of an engine room.

FIG. 2 is a top view of the engine room 19. The engine 20 is arranged in an orientation that a crankshaft 21 thereof (a shaft axis thereof alone is shown) is directed to the vehicle width direction. The transmission device (a gear type transmission) 28 is arranged behind the engine 20. The V-belt type continuously variable transmission 1 is arranged on the left side surfaces of the engine 20 and the transmission device 28. A transmission case assembly 3 forming the outer shape of the V-belt type continuously variable transmission 1 includes a transmission case body 31 and a transmission cover 32.

The transmission case body 31 is connected to an air intake duct 7 and an exhaust duct 8. Then, cooling air is supplied through the air intake duct 7 to the inside of the transmission case assembly 3 and then the air is discharged from the transmission case assembly 3 through the exhaust duct 8 to the outside. The air intake duct 7 leads from an intake port 7a located in the rightward of the engine 20, through a bent part 7b bypassing the engine 20 around the rear part, to the transmission case body 31. The exhaust duct 8 extends upward from the rear end part of the transmission case body 31 and then is bent. Then, an exhaust port 8a is opened in the upper part of the transmission device 28.

Figure 3:
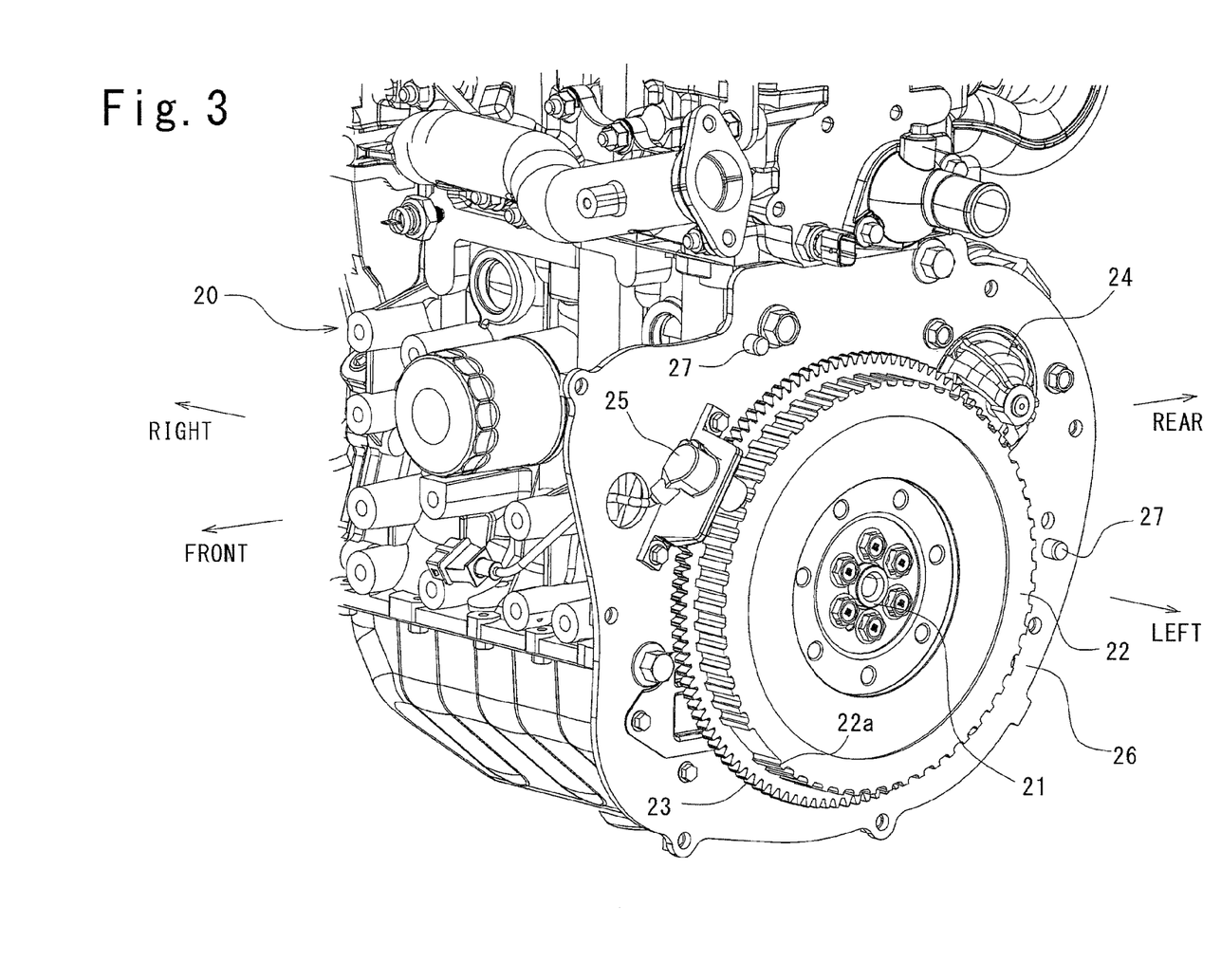
FIG. 3 is a perspective view of an engine, where the vicinity of a flywheel is enlarged.

FIG. 3 is a perspective view of the engine 20 viewed from obliquely forward left side. An attachment plate 26 used for attaching the V-belt type continuously variable transmission 1 (see FIG. 2) is attached to the left side surface of the engine 20. The crankshaft 21 passes through the attachment plate 26 and extends leftward. Then, a flywheel 22 is attached to the left end part of the crankshaft 21. The flywheel 22 includes: an outer periphery gear 22a formed in an integrated manner in the outer periphery; and a ring gear 23 fixed in the rightward of the outer periphery gear 22a.

A starter 24, a crank angle sensor 25, and a pair of dowel pins 27 are attached to the attachment plate 26. When electricity is supplied, the starter 24 revolves the ring gear 23 and thereby revolves the crankshaft 21 with the flywheel 22 in between. By virtue of this, the engine 20 is started. The crank angle sensor 25 detects the outer periphery gear 22a of the flywheel 22 so as to detect the angle of rotation of the crankshaft 21 and is used for operation control of the engine 20. The dowel pins 27 are used for positioning of the V-belt type continuously variable transmission 1 (see FIG. 2).

(V-Belt Type Continuously Variable Transmission 1)

Figure 4:
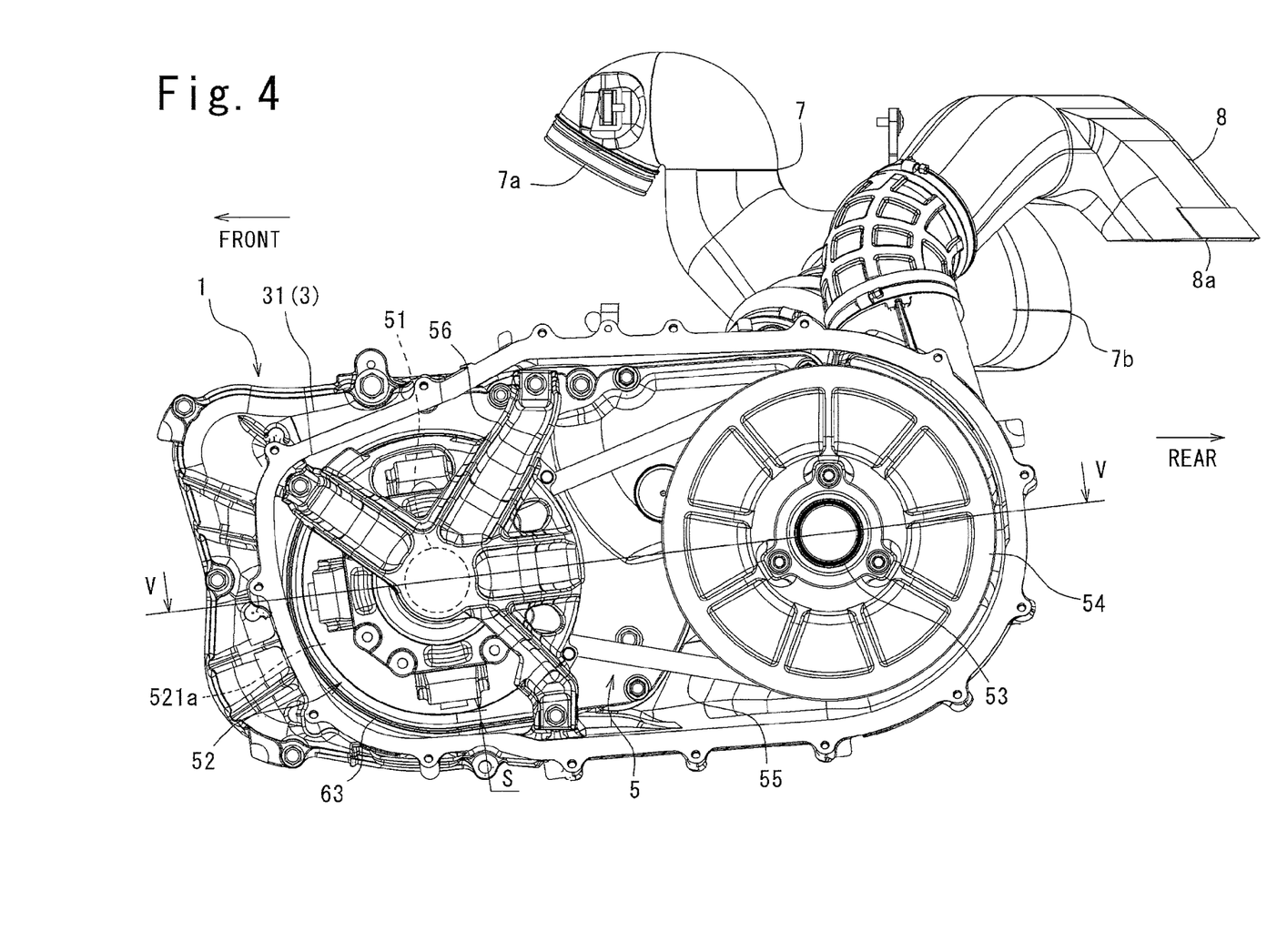
FIG. 4 is a left side view of a V-belt type continuously variable transmission.

FIG. 4 is a left side view of the V-belt type continuously variable transmission 1, showing the inside of the transmission case assembly 3 in a situation that the transmission cover 32 (see FIG. 2) is removed. The inside of the transmission case assembly 3 accommodates a transmission mechanism 5 constructed from: a drive shaft 51; a drive pulley 52 arranged on the drive shaft 51; a driven shaft 53; a driven pulley 54 arranged on the driven shaft 53; a V-belt 55 wound around both pulleys 52 and 54; a holder 56 for supporting the left end part of the drive shaft 51; and the like.

Figure 5:
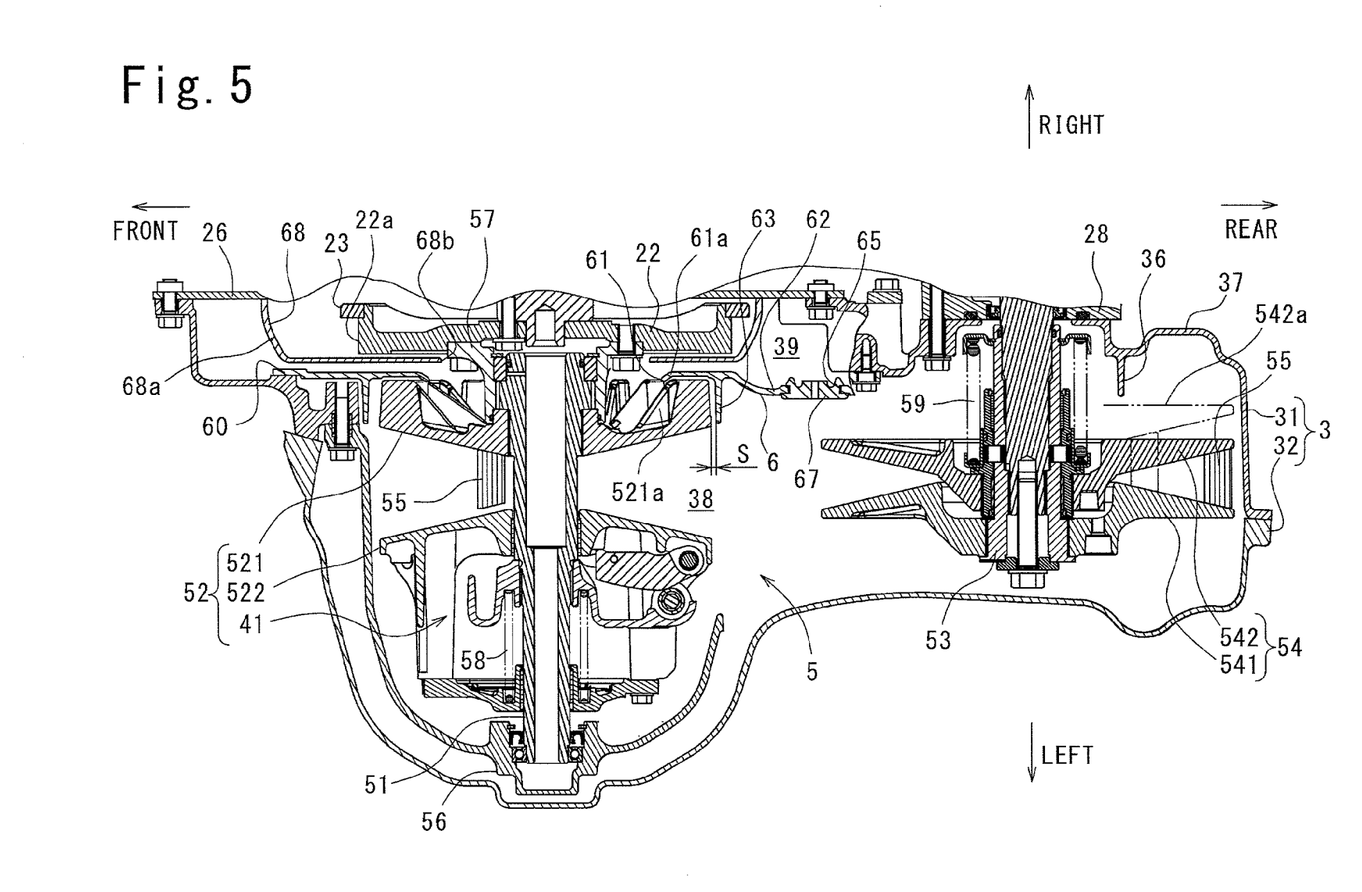
FIG. 5 is a sectional view taken along line V-V in FIG. 4, showing the inside of a V-belt type continuously variable transmission.

FIG. 5 shows a cross section taken along line V-V in FIG. 4 and is a sectional view taken along a line passing the drive shaft 51 and the driven shaft 53. In the inside of the transmission case assembly 3, a partition plate 6 is arranged for partitioning the inside of the transmission case assembly 3 into a left and a right part. Between the partition plate 6 and the transmission covers 32, a transmission chamber 38 is formed for accommodating the transmission mechanism 5. Further, an air intake chamber 39 is formed between the partition plate 6 and the attachment plate 26.

(Drive Pulley 52)

As shown in FIG. 5, in the drive shaft 51, the right end part is connected to the flywheel 22 with a coupling 57 in between and the left end part is supported by the holder 56 with a bearing in between. The drive pulley 52 is constructed from: a fixed sheave 521 fixed to the drive shaft 51 non-movably in the drive shaft direction; a movable sheave 522 fit onto the drive shaft 51 movably in the drive shaft direction; a sheave thrust generation mechanism 41 of flyweight type; and the like.

The rear face (the right side surface) of the fixed sheave 521 is provided with a cooling fin 521a extending approximately radially from the shaft axis of the drive shaft 51. In association with revolution of the fixed sheave 521, cooling air in the air intake chamber 39 is discharged from the inner side of the radial direction to the outer side of the radial direction by the cooling fin 521a and then supplied to the transmission chamber 38. That is, the cooling fin 521a is constructed as a so-called centrifugal fan.

The movable sheave 522 is opposite to the fixed sheave 521 from the left side of the drive shaft direction and biased leftward by a pressure adjustment spring 58. As known in the present technical field, the sheave thrust generation mechanism 41 is constructed such as to press the movable sheave 522 rightward in association with a rise in the revolution speed of the drive shaft 51. That is, when the drive shaft 51 is stopping or at a low revolution speed, the movable sheave 522 is separated from the V-belt 55 and located in the leftward. However, in association with a rise in the revolution speed of the drive shaft 51, the movable sheave 522 is moved rightward by the sheave thrust generation mechanism 41 so as to pinch the V-belt 55 from right and left in cooperation with the fixed sheave 521.

(Driven Pulley 54)

The driven shaft 53 is formed in an integrated manner with a transmission input shaft of the transmission device 28. The driven pulley 54 is constructed from: a fixed sheave 541 fixed to the driven shaft 53 non-movably in the driven shaft direction; a movable sheave 542 fit onto the driven shaft 53 in a spirally movably in the driven shaft direction; and the like.

The movable sheave 542 is opposite to the fixed sheave 541 from the right side of the driven shaft direction and biased leftward by a pressure adjustment spring 59 so that the V-belt 55 is pinched from right and left by compression surfaces of conical shapes formed in both sheaves 541 and 542. That is, when the tension of the V-belt 55 is low, the movable sheave 542 is located in the leftward at a low position that the belt winding radius of the driven pulley 54 is maintained to be large. On the other hand, when the tension of the V-belt 55 increases, the movable sheave 542 moves to a position 542a in the rightward indicated by a dashed line in FIG. 5, in a manner of being gradually twisted relative to the fixed sheave 541. This position is a high position that the belt winding radius of the driven pulley 54 is reduced.

(Transmission Case Assembly 3)

Figure 6:
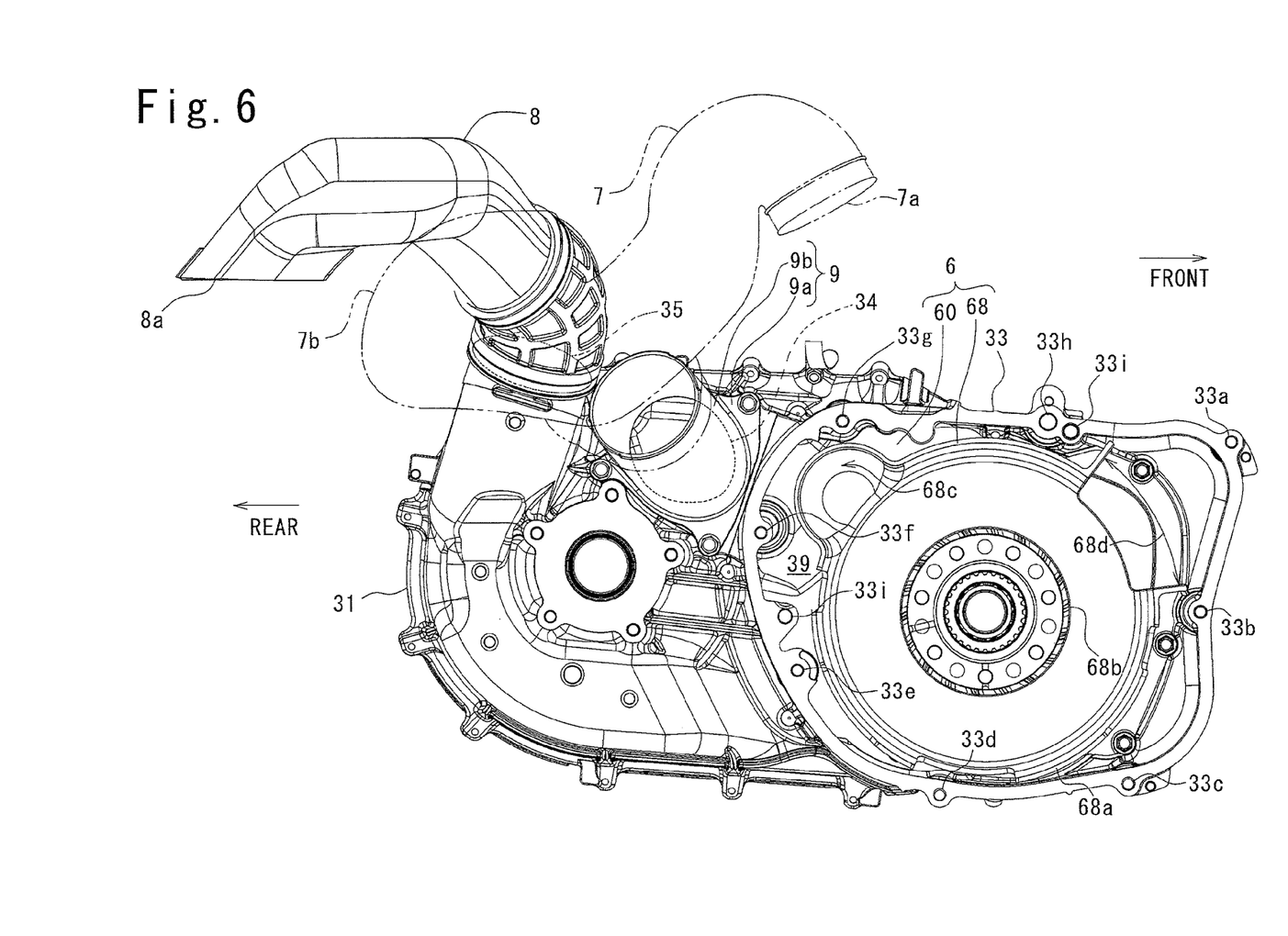
FIG. 6 is a right side view of a V-belt type continuously variable transmission.

FIG. 6 is a right side view of the V-belt type continuously variable transmission 1, where the air intake duct 7 is made transparent and indicated by a dashed line. The transmission case body 31 includes: an attachment flange 33 formed in an approximately frontward half part; an inlet opening 34 formed in a somewhat rearward part relative to the center part in forward and backward directions; and an outlet opening 35 formed in the rear part. The transmission case body 31 is positioned when a pair of dowel pin holes 33i are fit onto the pair of the dowel pins 27 (see FIG. 3) of the attachment plate 26. Then, the transmission case body 31 is attached to the attachment plate 26 (see FIG. 3) by using attachment holes 33a to 33h.

The inlet opening 34 is opened rightward in fluid communication with the air intake chamber 39 and connected to one end part of the air intake duct 7 with an air intake fitting 9 in between. The outlet opening 35 is opened approximately upward and the tip part is connected to one end part of the exhaust duct 8.

The air intake fitting 9 is constructed from: a base 9a attached to the transmission case body 31; and an air intake duct connection port 9b connected to the air intake duct 7. The air intake duct connection port 9b extends obliquely rear upward in the side view shown in FIG. 6, then extends obliquely rear rightward in the top view shown in FIG. 2, and then is inclined relative to the base 9a. That is, the air intake duct connection port 9b is inclined relative to the base 9a such as to be oriented to the bent part 7b of the air intake duct 7. Here, the air intake fitting 9 may be not constituted of a separate member and may be formed in an integrated manner with the transmission case body 31.

Figure 7:
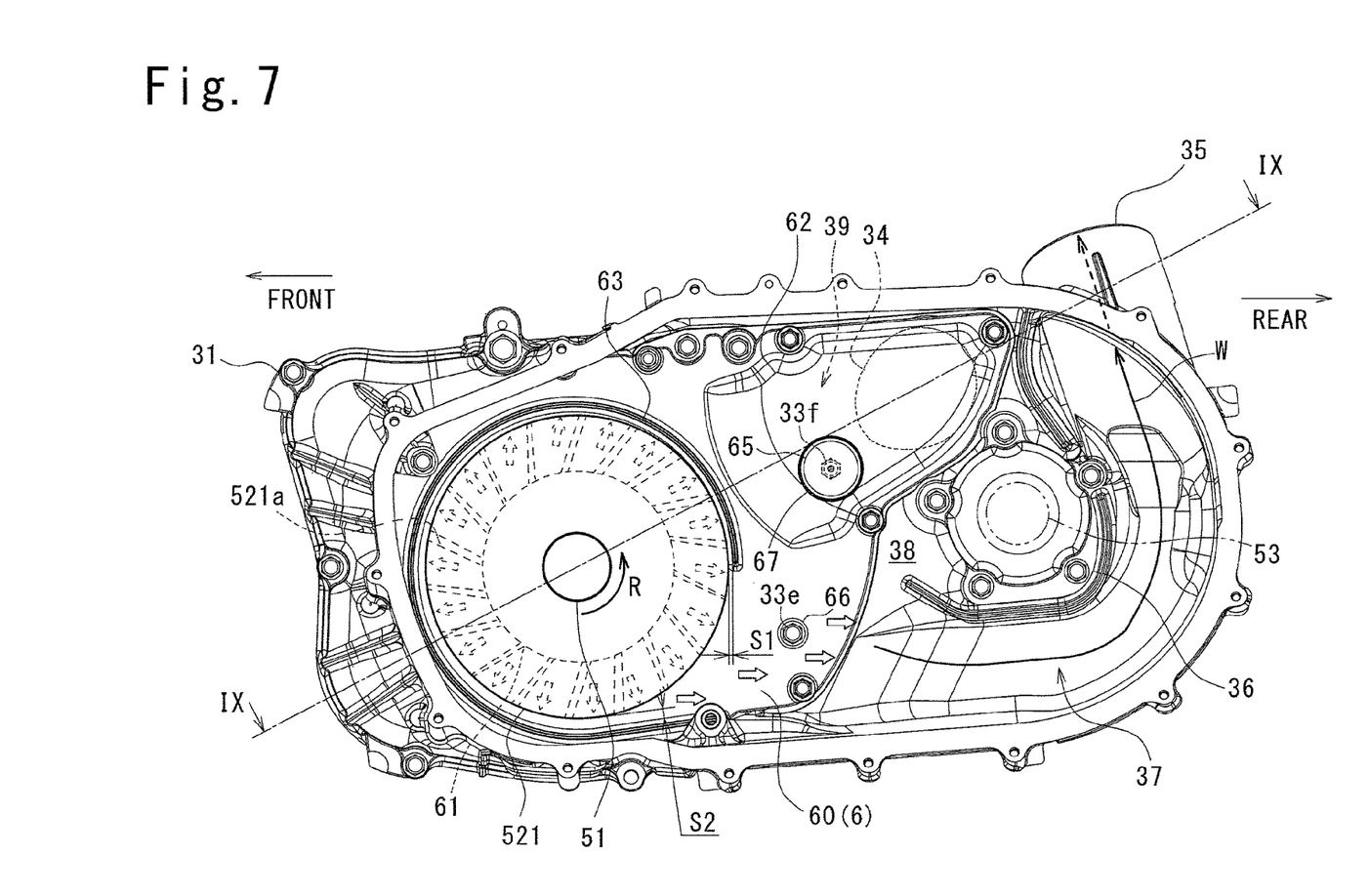
FIG. 7 is a left side view showing a state that partition plate is attached to a transmission case.

FIG. 7 is a left side view showing a situation that the partition plate 6 is attached to the transmission case body 31 and then the drive shaft 51 and the fixed sheave 521 on the drive shaft 51 side are further attached, where the driven shaft 53 is indicated by a dashed line. In the transmission case body 31, an outlet-side rib 36 is stood and formed in a counterclockwise manner from the lower part to the outlet opening 35 in the surroundings of the driven shaft 53. In the outer periphery of the outlet-side rib 36, an exhaust passage W is formed for guiding the cooling air to the outlet opening 35. In the transmission case body 31 defining the right end part of the exhaust passage W, an outlet-side recess 37 is recessed rightward.

(Partition Plate 6)

Figure 8:
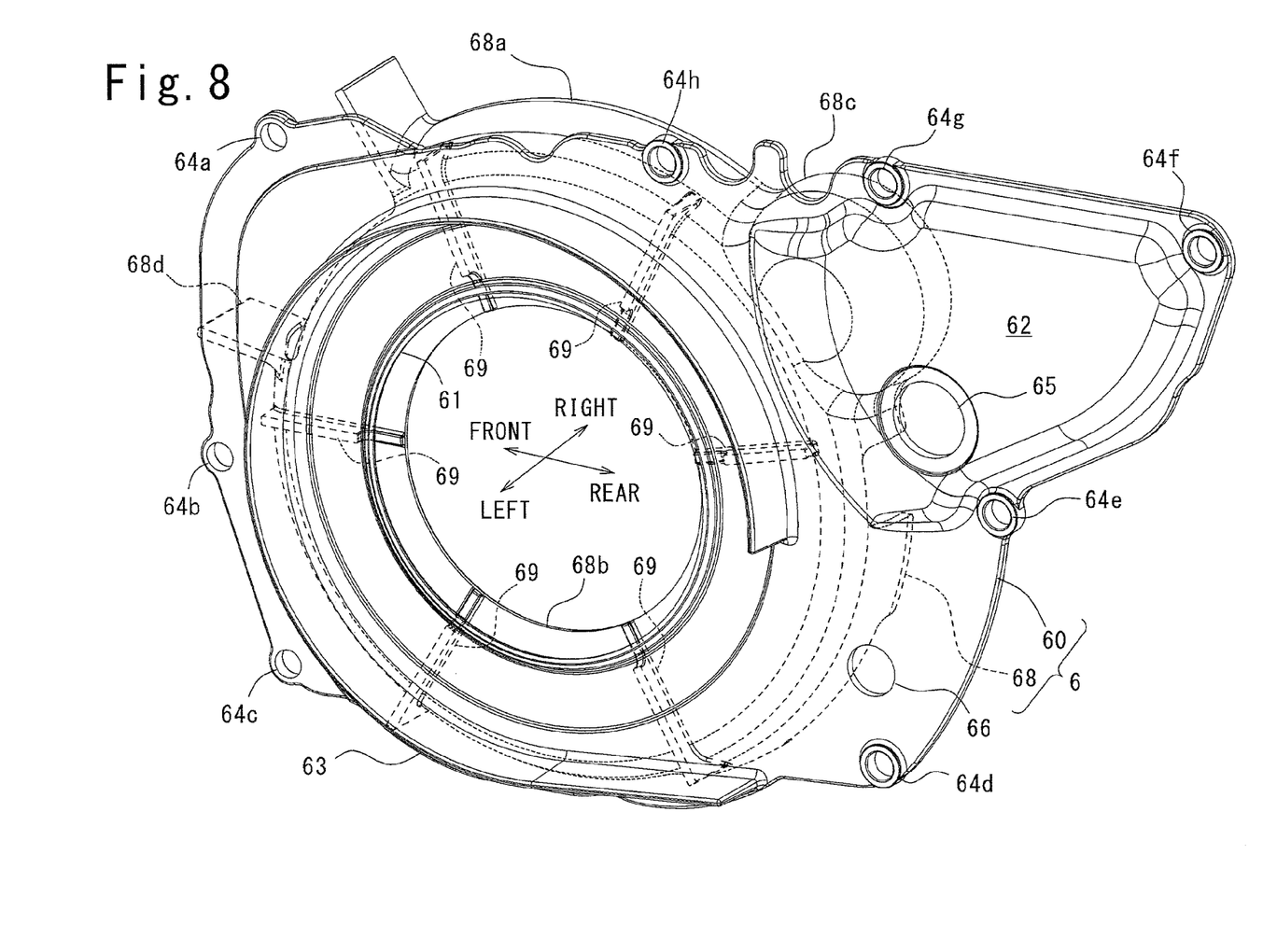
FIG. 8 is a perspective view of a partition plate.

FIG. 8 is a perspective view of the partition plate 6. The partition plate 6 includes: a partition plate body 60; and a flywheel cover 68 arranged in the rightward of the partition plate body 60 with a predetermined gap in between. The partition plate body 60 and the flywheel cover 68 are made from resin and connected to each other at a joining part 69 by vibration welding.

In the partition plate body 60, an air inlet part 61 going through right and left is provided in an approximately center part. Further, an inlet-side recess 62 is recessed leftward at the rearward part, and a casing 63 (a guide plate) protruding leftward is provided in the outer periphery of the air inlet part 61.

In the periphery of the partition plate body 60, eight attachment holes 64a to 64h are provided. Then, the partition plate 6 is attached to the transmission case body 31 (see FIG. 5) by using the attachment holes 64a to 64h. Here, in the attachment holes 64a to 64c on the front side, bolts are attached from the right side. Further, in the attachment holes 64d to 64h on the rear side, bolts are attached from the left side.

As shown in FIG. 5, the air inlet part 61 is formed such as to surround the drive shaft 51 and establish fluid communication between the air intake chamber 39 and the transmission chamber 38. Further, in the inner peripheral edge, a bent part 61a is formed such as to be bent along the cooling fin 521a. The bent part 61a permits smooth supply of cooling air from the air intake chamber 39 to the cooling fin 521a.

As shown in FIG. 7, the inlet-side recess 62 is formed approximately over a range opposite to the inlet opening 34 of the transmission case body 31. The casing 63 is stood over a range of approximately 270 degrees from the rear part of the air inlet part 61 to the lower part in a counterclockwise direction. The gap in the radial direction between the casing 63 and the fixed sheave 521 gradually increases from the rear part S1 to the lower part S2 along the rotation direction R of the fixed sheave 521. This improves the operation of discharging cooling air to the transmission chamber 38 performed by the cooling fin 521a.

Meanwhile, as described above, in the partition plate 6, the attachment holes 64a to 64c on the front side are for attachment from the air intake chamber 39 side. Thus, before the transmission case body 31 is attached to the attachment plate 26, the partition plate 6 need be attached in advance to the transmission case body 31. As a result, when the transmission case body 31 is to be attached to the attachment plate 26, the partition plate body 60 interrupts and causes difficulty in accessing (bolt tightening) from the transmission chamber 38 side to the attachment holes 33f and 33e. Thus, in the partition plate body 60, openings 65 and 66 are formed at positions corresponding to the attachment holes 33f and 33e so that the attachment holes 33f and 33e can be accessed through the openings 65 and 66 even in a state that the partition plate 6 has been attached.

Here, the opening 65 is provided on the inlet-side recess 62. Thus, the transmission chamber 38 and the air intake chamber 39 are in fluid communication with each other through the opening 65. Then, after the transmission case body 31 is attached to the attachment plate 26, the opening 65 is closed with a grommet 67. Thus, the fluid communication between the air intake chamber 39 and the transmission chamber 38 is stopped so that returning of cooling air from the transmission chamber 38 to the air intake chamber 39 is avoided. Here, the opening 66 is not in fluid communication with the air intake chamber 39, and hence need not be closed.

As shown in FIG. 8, the flywheel cover 68 includes: a flywheel cover body 68a of approximate cup shape opened rightward; an opening 68b opened in the center part; a starter cover 68c provided in the upper rearward part; and a notch 68d for sensor formed in the upper frontward part. Then, the flywheel cover 68 is formed in the shape of a smoothly curved surface.

As shown in FIG. 5, the flywheel cover body 68a is formed such as to cover the periphery (i.e., the outer periphery gear 22a and the ring gear 23) of the flywheel 22. The opening 68b is provided such as to surround the coupling 57. With reference to FIGS. 3 and 6, the starter cover 68c is formed such as to cover the starter 24 protruding into the air intake chamber 39. Further, the notch 68d for sensor is provided at a position corresponding to the crank angle sensor 25.

(Operation)

Figure 9:
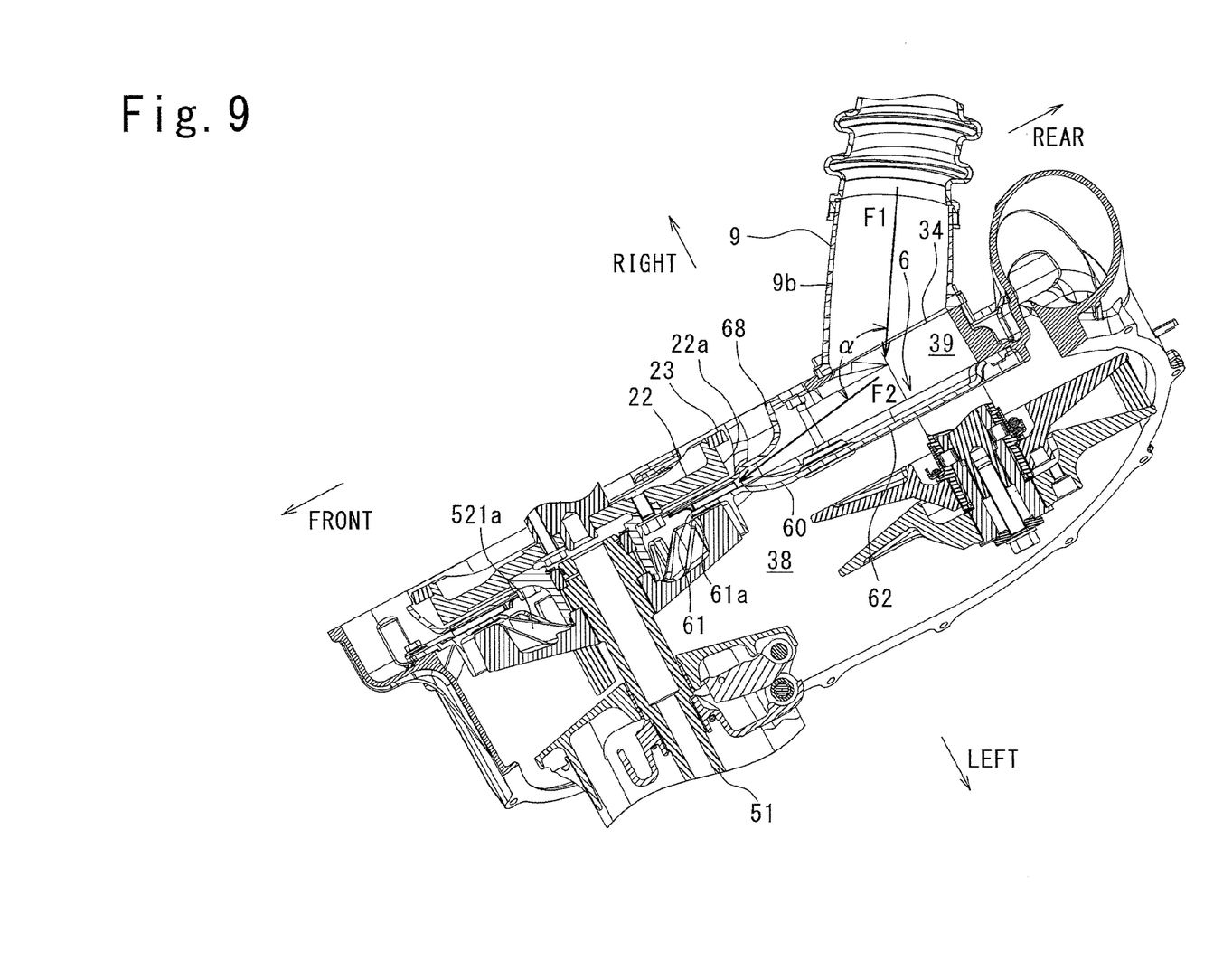
FIG. 9 is a sectional view taken along line IX-IX in FIG. 7, showing an air intake passage.

FIG. 9 is a cross section taken along line IX-IX in FIG. 7 and shows a passage for cooling air from the air intake fitting 9 to the cooling fin 521a. The air intake duct connection port 9b of the air intake fitting 9 is inclined toward the bent part 7b (see FIG. 2) in the rearward. Thus, the angle cc formed between the flow F1 of the cooling air in the air intake fitting 9 and the flow F2 of the cooling air leading from the inlet opening 34 to the cooling fin 521a in the frontward can be constructed moderate. This restrains a rise in the air intake pressure loss in the joining part between the flow F1 and the flow F2 so that smooth flow of the cooling air from the air intake fitting. 9 into the air intake chamber 39 is achieved.

Further, in the partition plate 6 defining the air intake chamber 39 and the transmission chamber 38, the inlet-side recess 62 is formed in a region opposite to the inlet opening 34. Thus, the volume of the air intake chamber 39 in the joining part with the air intake fitting 9 is enlarged. This restrains further a rise in the air intake pressure loss in the joining part.

The cooling air supplied to the air intake chamber 39 goes through a space between the partition plate body 60 and the flywheel cover 68 and then reaches the air inlet part 61. The flywheel 22 is located in the air intake chamber 39. However, since the flywheel cover 68 restrains the discharging operation in the circumferential direction caused by the flywheel 22, the cooling air can be supplied to the air inlet part 61.

Further, the cooling air can be supplied to the air inlet part 61 from approximately entire circumferential directions of the circumference of the drive shaft 51 between the partition plate body 60 and the flywheel cover 68. Thus, the volume of the passage for the cooling air is ensured sufficiently. Further, in the inner edge of the air inlet part 61, the bent part 61a is formed along the cooling fin 521a. Thus, the connection part from the air inlet part 61 to the cooling fin 521a is guided smoothly. This permits sufficient supply of cooling air from the air intake chamber 39 to the cooling fin 521a.

As shown in FIG. 7, in association with revolution of the drive shaft 51 connected to the crankshaft 21 with the flywheel 22 in between, the cooling air supplied to the air inlet part 61 is discharged outward in the radial direction by the cooling fin 521a. Then, since the partition plate body 60 is provided with the casing 63 surrounding the cooling fin 521a, the cooling air discharged by the cooling fin 521a goes around the drive pulley 52 and then is guided to the driven shaft 53 side.

The cooling air guided to the driven shaft 53 side is guided by the outlet-side rib 36 so as to go around the surroundings of the driven shaft 53 and then is discharged through the outlet opening 35 to the exhaust duct 8 (see FIG. 2). At that time, returning of the cooling air in the surroundings of the driven shaft 53 toward the drive shaft 51 side is avoided by the outlet-side rib 36 and hence the cooling air is smoothly discharged through the outlet opening 35.

Further, in the transmission case body 31, the outlet-side recess 37 is formed in the right side wall defining the exhaust passage W. Thus, even in the high state that the belt winding radius of the driven pulley 54 is reduced, the movable sheave 542a having moved to the right side avoids excessive reduction of the exhaust passage and hence ensures the passage area of the exhaust passage W. This ensures a discharging property for the cooling air from the transmission case assembly 3.

According to the V-belt type continuously variable transmission 1 having the above-mentioned configuration, the following effects are obtained.

(1) When the flywheel cover 68 is provided, discharging of the cooling air in the air intake chamber 39 in the circumferential direction caused by the flywheel 22 can be restrained. Thus, even when the flywheel 22 is located in the air intake chamber 39, the cooling air can be supplied from the air intake chamber 39 through the air inlet part 61 to the transmission chamber 38. Thus, even in a case that the cooling air is introduced from the vicinity of the flywheel 22, the amount of cooling air supply is ensured and hence the cooling property in the V-belt type continuously variable transmission 1 is ensured.

(2) When the periphery of the flywheel 22 is provided with gear teeth like the ring gear 23 engaging with the starter 24 and the outer periphery gear 22a detected by the crank angle sensor 25, the operation of discharging the cooling air in the air intake chamber 39 toward the circumferential direction caused by the flywheel 22 is further enhanced. However, the discharging operation can be restrained by the flywheel cover 68.

(3) The flywheel cover 68 and the partition plate body 60 are integrated with each other so that the partition plate 6 is constructed. This reduces the number of components and improves the assembly workability. Thus, productivity is improved.

(4) The casing 63 is provided for guiding the cooling air from the drive shaft 51 side to the driven shaft 53 side. Thus, the flow of the cooling air in the transmission chamber is rectified. This permits effective cooling of the transmission chamber 38.

(5) Cooling air can be supplied to the air inlet part 61 from approximately entire circumferential directions between the flywheel cover 68 and the partition plate body 60. Thus, the amount of cooling air supply is ensured so that the cooling property in the transmission chamber 38 is ensured.

(6) heat release from the transmission chamber 38 to the air intake chamber 39 is restrained by the partition plate body 60 made from resin having a low thermal conductivity. Similarly, heat release from the flywheel 22 to the air intake chamber 39 is restrained by the flywheel cover 68. As such, heat release from surrounding heat sources to the cooling air in the air intake chamber 39 is restrained and hence a temperature rise in the cooling air is restrained. Thus, the cooling property in the V-belt type continuously variable transmission 1 is ensured.

Various modifications and changes may be made without departing from the spirit and the scope of the present invention described in the claims.

What is claimed is:

1. A V-belt type continuously variable transmission constructed such as to accommodate in a transmission case a transmission mechanism including: a drive shaft connected to an engine flywheel and provided with a drive pulley; a driven shaft provided with a driven pulley; and a V-belt wound around between the drive pulley and the driven pulley, the V-belt type continuously variable transmission comprising:

an air intake chamber for introducing cooling air to surroundings of the drive shaft; and a flywheel cover for covering at least a periphery of the flywheel located in the air intake chamber.

2. The V-belt type continuously variable transmission according to claim 1, wherein gear teeth are formed in the periphery of the flywheel.

3. The V-belt type continuously variable transmission according to claim 1, comprising a partition plate for partitioning the transmission case into a transmission chamber for accommodating the transmission mechanism and into the air intake chamber, wherein the flywheel cover is attached to the partition plate.

4. The V-belt type continuously variable transmission according to claim 3, further comprising a fan provided in the drive pulley and supplying into the transmission chamber the cooling air in the surroundings of the drive shaft, wherein the partition plate is provided with a guide plate for guiding the cooling air supplied by the fan to the surroundings of the driven shaft.

5. The V-belt type continuously variable transmission according to claim 4, wherein the cooling air is supplied from approximately entire circumferential directions between the flywheel cover and the partition plate to the surroundings of the drive shaft.

6. The V-belt type continuously variable transmission according to claim 3, wherein the partition plate and the flywheel cover are made from resin.

* * * * *